US012788653B2

(12) United States Patent
Dozal

(10) Patent No.: US 12,788,653 B2
(45) Date of Patent: Nov. 10, 2026

(54) PATIENT HELPER HANDLE SELF-LOCKING CLAMP

(71) Applicant: HILL-ROM SERVICES, INC., Batesville, IN (US)

(72) Inventor: Omar H. Dozal, Batesville, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

(21) Appl. No.: 18/952,469

(22) Filed: Nov. 19, 2024

(65) Prior Publication Data

US 2025/0177224 A1 Jun. 5, 2025

Related U.S. Application Data

(60) Provisional application No. 63/604,537, filed on Nov. 30, 2023.

(51) Int. Cl.
*A61G 7/053* (2006.01)

(52) U.S. Cl.
CPC ...... *A61G 7/0533* (2013.01); *A61G 2200/327* (2013.01)

(58) Field of Classification Search
CPC ... A61G 7/0533; A61G 22/327; A61G 7/0536
USPC .............................................................. 5/662
See application file for complete search history.

(56) References Cited

U.S. PATENT DOCUMENTS 4,551,872 A * 11/1985 Reed .......................... F16B 2/10 601/24
4,887,325 A * 12/1989 Tesch ................... A61G 7/1015 24/136 L
5,836,026 A 11/1998 Reed
6,058,531 A 5/2000 Carroll
6,505,365 B1 1/2003 Hanson et al.
6,581,897 B2 6/2003 Ruschke
7,039,971 B2 5/2006 Sebastien
7,536,738 B2 5/2009 Richards et al.
10,369,063 B2 8/2019 Matheny et al.
2007/0277322 A1* 12/2007 Pastusek .............. A61G 7/0536 5/662
2008/0263773 A1* 10/2008 Pastusek .............. A61G 7/0536 5/662
2017/0359017 A1* 12/2017 Corio ..................... F16M 11/18

FOREIGN PATENT DOCUMENTS

CN 109662850 A 4/2019
EP 0610664 B1 4/1997
WO 2013049583 A1 4/2013

* cited by examiner

*Primary Examiner* — David R Hare
*Assistant Examiner* — Joseane E. Tejada
(74) *Attorney, Agent, or Firm* — Barnes & Thornburg LLP

(57) ABSTRACT

A patient helper includes a support arm configured to be secured to a patient support apparatus, a clamp movable along the support arm to a plurality of positions, a tether supported by the first pin, and a handle supported by the tether. The clamp includes a plurality of grip arms, the grip arms pivotably coupled at a first axis and a first pin. The grip arms are movable between a first position in which the grip arms apply a force to the support arm sufficient to prevent movement of the clamp along the support arm and a second position in which the clamp is free to move along the support arm.

20 Claims, 5 Drawing Sheets

PATIENT HELPER HANDLE SELF-LOCKING CLAMP

CROSS-REFERENCE TO RELATED APPLICATIONS

This application claims priority under 35 U.S.C. § 119(e) to U.S. Provisional Application No. 63/604,537, filed on Nov. 30, 2023, which is expressly incorporated by reference herein.

BACKGROUND

The present disclosure is related to a patient helper in a patient support apparatus that is used to aid the patient while occupying the patient support apparatus, adaptable to various levels of acuity to provide support to a patient with minimal caregiver help. More specifically, the present disclosure is related to a patient helper that does not slip out of position when used by a patient.

In the modern healthcare facility, patients are often kept for extended periods in the emergency unit or an observation ward on patient support apparatus while tests are run, and the patient is under observation. Patient support apparatus (i.e., beds and stretchers) typically have a patient helper that the patient can hold onto for support when changing positions or performing an activity. However, if the patient helper is not tightly clamped, it can slip due to the force exerted by the patient and potentially impact patient health. The challenge with the patient helper is designing it so that the patient helper can move on a support arm of the patient support apparatus such that the patient can position it where required, but once positioned and when used by the patient, the patient helper should not slip of the selected position.

Thus, there is a need for a patient helper that can be easily manipulated by the patient when required. The present disclosure is directed to a device and methods of using a device that can aid a patient on a patient support apparatus. The present disclosure is directed to a patient helper that can self-lock on a support arm of the patient support apparatus.

SUMMARY

The present disclosure includes one or more of the features recited in the appended claims and/or the following features which, alone or in any combination, may comprise patentable subject matter.

According to a first aspect of the present disclosure, a patient support apparatus comprises a patient helper including a support arm configured to be secured to a patient support apparatus, a tether supported by the first pin, and a handle supported by the tether. The clamp is configured to be movable along the support arm to a plurality of positions. The clamp includes a plurality of grip arms, the grip arms pivotably coupled at a first axis. The clamp further includes first pin wherein the grip arms are movable between a first position in which the grip arms apply a force to the support arm sufficient to prevent movement of the clamp along the support arm and a second position in which the clamp is free to move along the support arm.

In some embodiments, the first pin may be supported in a slot in the grip arm.

In some embodiments, the first pin may be a support pin that when loaded acts upon the grip arms to transfer a force applied to the tether by a patient. In some embodiments, the force may be applied by the patient through the handle supported by the tether.

In some embodiments, the support pin may induce a moment along a second axis that moves the grip arms to the first position and locks the clamp on the support arm preventing movement of the clamp along the support arm. In some embodiments, the clamp may be unlocked, and the grip arms may be configured to be in the second position when the force applied by the patient is removed.

In some embodiments, the clamp may comprise at least a first and a second grip arm, and the first and the second grip arm may form an octagonal conduit. In some embodiments, the support arm may have an octagonal cross-section and the support arm may be configured to pass through the octagonal conduit.

In some embodiments, the grip arms may be pivotably coupled at a first location with the first pin and at a second location with a second pin along the first axis, wherein the first axis is perpendicular to the support arm.

In some embodiments, the clamp may include a first grip arm and a second grip arm, the first grip arm and the second grip arm are coupled with the first pin and the second pin to form a conduit configured to fit the support arm. In some embodiments, the conduit may be formed by the first grip arm and the second grip arm is an octagonal conduit.

According to a first aspect of the present disclosure, a clamp for a patient support apparatus includes a plurality of grip arms and a first pin. The grip arms are pivotably coupled at a first axis and are movable between a first position and a second position based on a force applied to a tether supported by the clamp.

In some embodiments, the first pin may be supported in a slot in the grip arm. In some embodiments, the first pin may be configured to transfer a force applied to the tether supported by the first pin to the grip arms.

In some embodiments, the force may be applied by the patient through a handle supported by the tether.

In some embodiments, the support pin may induce a moment along a second axis that moves the grip arms to the first position and locks the clamp on a support arm on the patient support apparatus thereby preventing movement of the clamp along the support arm. In some embodiments, the clamp may be unlocked, and the grip arms may be configured to be in the second position when the force applied by the patient is removed.

In some embodiments, the clamp may comprise at least a first and a second grip arm, and the first and the second grip arm form an octagonal conduit. In some embodiments, a support arm with an octagonal cross-section may be configured to pass through the conduit. In some embodiments, grip arms may be pivotably coupled at a first location with the first pin and at a second location with a second pin along the first axis.

In some embodiments, the clamp may include a first grip arm and a second grip arm. The first semicircular grip arm and the second grip arm may be coupled with the first pin and the second pin to form a conduit configured to fit a support arm on the patient support apparatus. In some embodiments, the conduit formed by the first grip arm and the second grip arm may be an octagonal conduit.

Additional features, which alone or in combination with any other feature(s), such as those listed above and/or those listed in the claims, can comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which.

DETAILED DESCRIPTION

Figure 1:
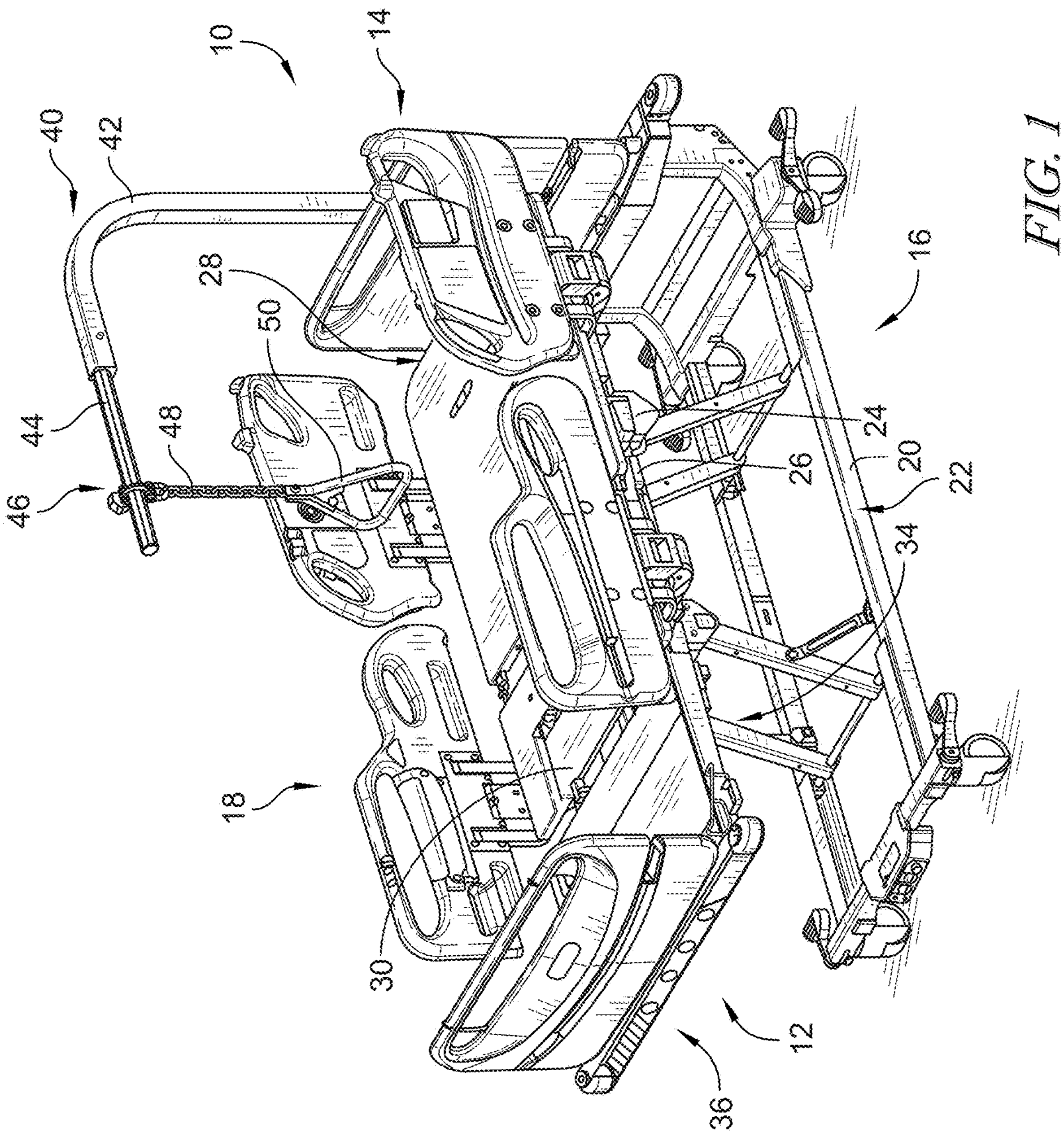
FIG. 1 is a perspective view of a patient helper located on a patient support apparatus according to the present disclosure.

According to the present disclosure, a patient support apparatus 10 shown in FIG. 1 is embodied as a hospital bed 10. The hospital bed 10 has a head end 14 opposite the foot end 12. A left side 16 refers to the patient's left when the patient is lying in the hospital bed 10 in a supine position. A right side 18 refers to the patient's right when the patient is lying in the hospital bed 10 in a supine position. The hospital bed 10 includes a base frame 20 which supports a lift system 22. The lift system 22 engages the base and an upper frame 24 such that the lift system 22 moves the upper frame 24 vertically relative to the base frame 20. The upper frame 24 supports a load frame 26. The load frame 26 supports a head deck 28 which is movable relative to the load frame 26. The load frame 26 also supports a seat deck 30. Also supported from the load frame 26 is a foot deck 34 that is articulated and moveable relative to the load frame 26. Additional information is provided to a caregiver through an optional indicator panel 36 which displays the status of various conditions of the hospital bed 10 graphically to a caregiver at the foot end 12 of the hospital bed 10. The location of the indicator panel 74 makes the statuses of the conditions easily discernable from a distance, such that a caregiver may quickly ascertain the statuses from the hallway or the door of a patient's room.

Figure 2:
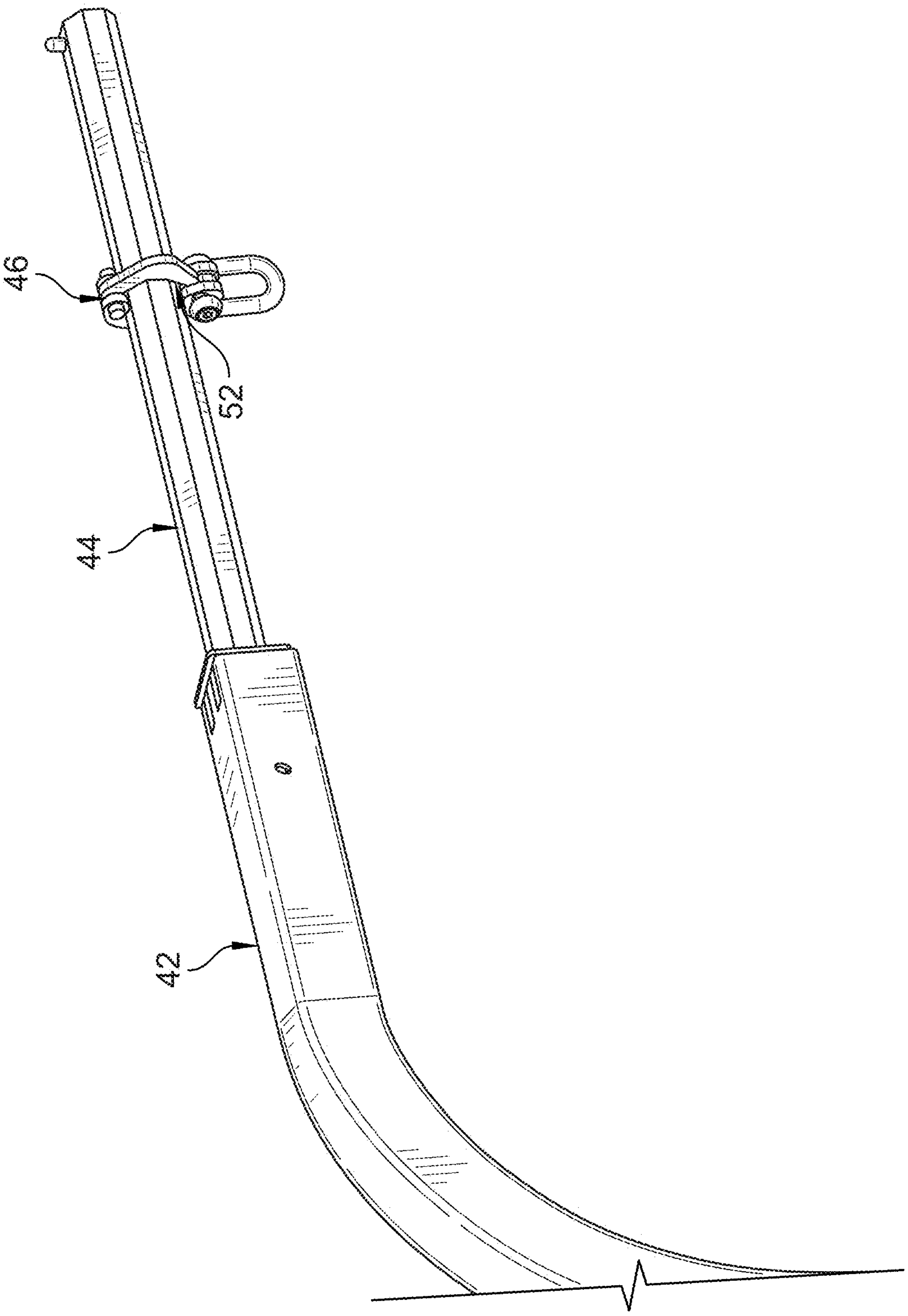
FIG. 2 is an illustration of a clamp of the patient helped configured to move on a support arm of the patient support apparatus.
Figure 3:
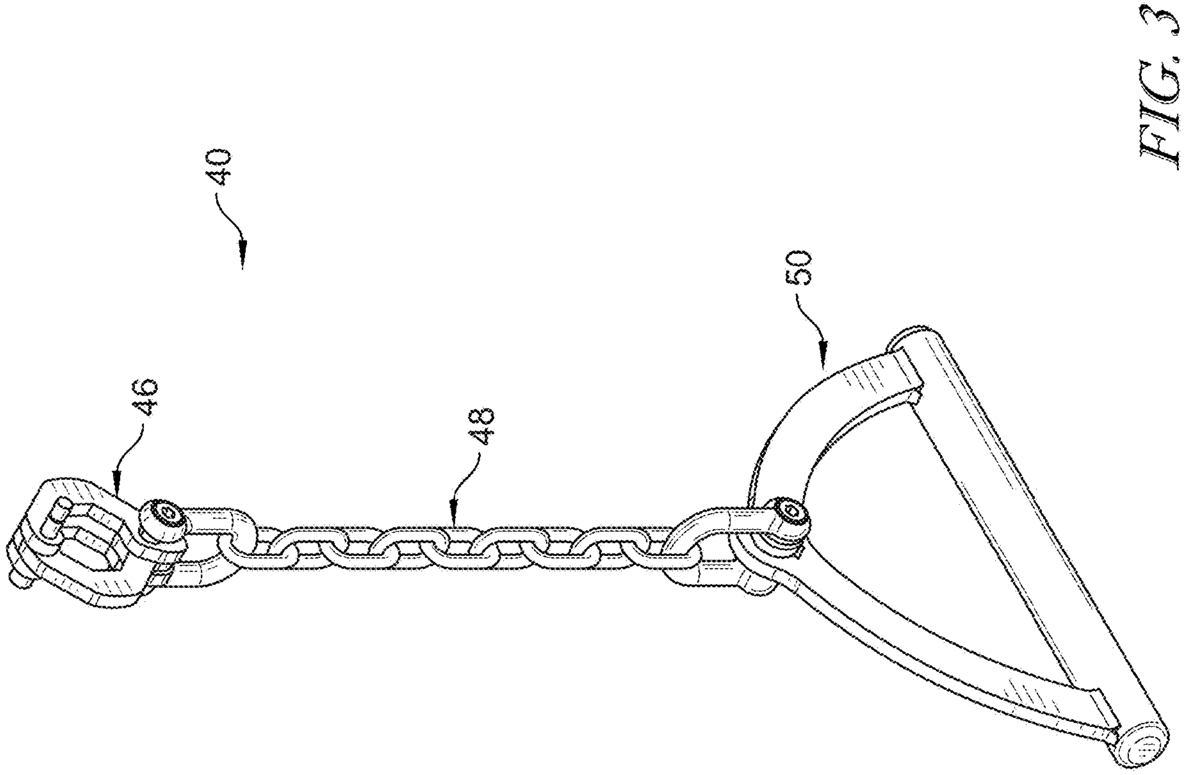
FIG. 3 is an illustration of the patient helper comprises the clamp, a tether, and a handle.

As shown in FIGS. 1-3, the hospital bed 10 includes a patient helper 40, which is supported from the base frame 20. The patient helper 40 can be used by the patient as a support or aid when the patient is on the hospital bed 10 or accessing the hospital bed 10. The patient helper 40 includes a curved arm 42 that is fixed to the base frame 20 with a support arm 44 extending from the curved arm 42. The support arm 44 is formed to include an octagonal cross-section which provides a resistance to rotation of a clamp 46 when the clamp 46 is secured to the support arm 44. The clamp 46 supports a chain 48 or a tether 48 which descends vertically from the clamp 46. The tether 48 supports a grip 50 or a handle 50 which is graspable by a patient positioned in a supine position on the hospital bed 10 so that the patient may use the patient helper 40 to reposition themselves in the hospital bed 10.

Figure 4:
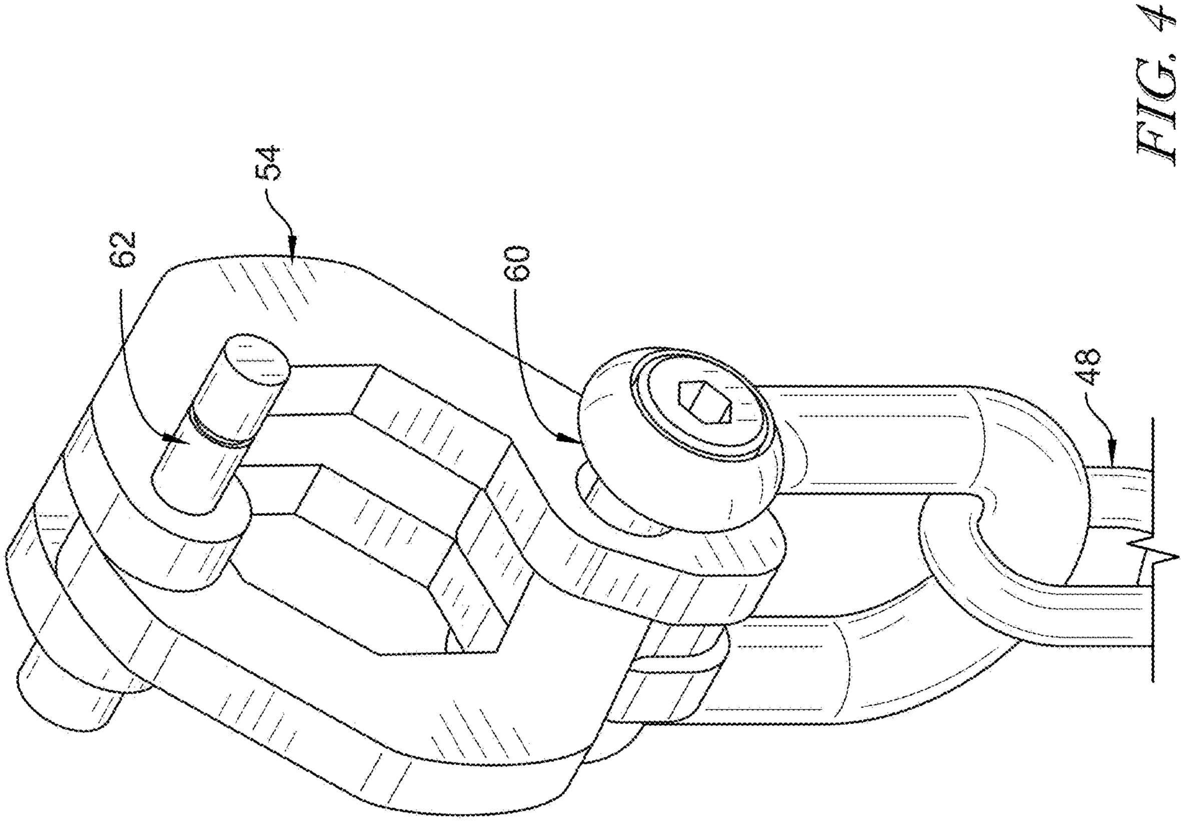
FIG. 4 is an illustration of an octagonal conduit formed by a plurality of grip arms of the clamp of the patient helper.
Figure 5:
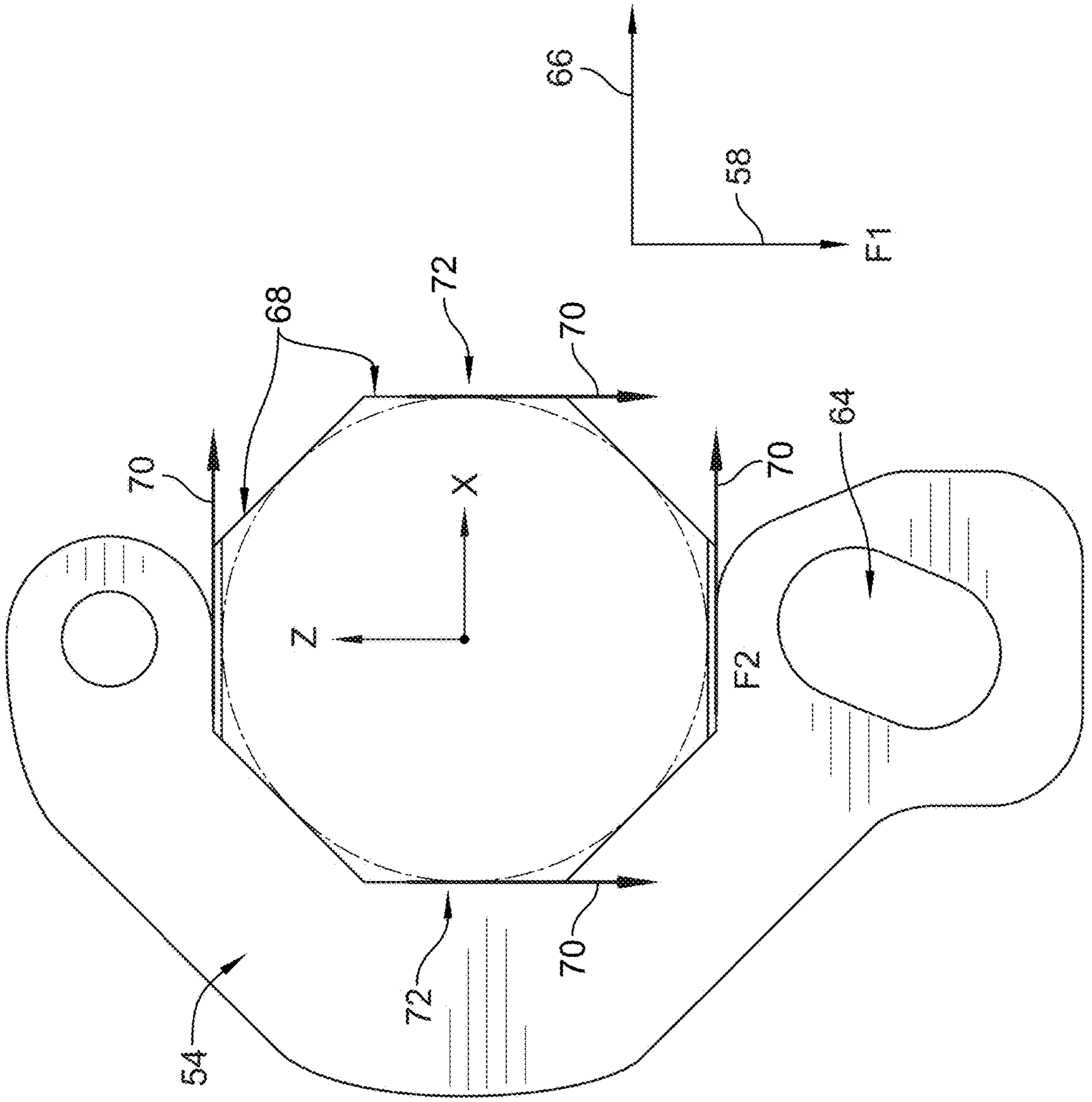
FIG. 5 is an illustration of the forces acting on a grip arm of the clamp of the patient helper upon application of a force by a patient.

Referring now to FIG. 2, the patient helper 40 is configured to be movable along the support arm 44. The support arm 44 has an octagonal cross-section and the support arm 44 is configured to pass through an octagonal conduit 52 in the clamp 46. The octagonal conduit 52 is formed by one or more semicircular grip arms 54 pivotably coupled along a first axis 58 as shown in FIGS. 4-5. The grip arms 54 are coupled to each other by a first pin 60 and a second pin 62 along the same axis 58. The first pin 60 is a support pin 60 and is supported in a slot 64 of the grip arms 54. The tether 48 is supported by the first pin.

The clamp 46 that is used to secure the patient helper 40 to the support arm 44 is configured to operate as a cam action clamp 46. As shown in FIG. 5, the patient can exert a downward force $F_1$ along the first axis 58 on the clamp 46 by pulling the handle 50. Prior to the patient exerting the downward force $F_1$, the grip arms 54 of the clamp 46 are in a first open position. When such force $F_1$ is exerted, the support pin 60 induces a moment along a second axis 66 that moves the grip arms 54 into a second closed position. Thus, when loaded, the support pin 60 acts upon the grip arms 54 to transfer the force $F_1$ applied to the tether 48 by a patient.

The grip arms 54 exert force $F_2$ on the support arm 44 along grip surfaces 68 creating static friction between the grip arms 54 and the support arm 42. The static friction causes clamp 46 to self-lock in this second closed position. This ensures immediate locking of the patient helper 40 at the location of the patient's choosing. This is unlike a manual clamp that requires the patient or a helper to lock the manual clamp at any given location on the support arm 44. When the patient releases the downward force $F_1$ on the clamp 46 by releasing the handle 50, the clamp 46 no longer exerts any force $F_2$ on the support arm 44 and the clamp 46 is no longer locked. The clamp 46, and therefore, the patient helper 40 can then be moved to a different location on the support arm 44.

In some embodiments, as shown in FIG. 5, the support arm 44 can have a different cross-section than the conduit 52 formed by the grip arms 54. For example, the support arm 44 can have a round cross-section and the conduit 52 formed by the grip arms 54 can be octagonal. The grip surfaces 68 formed by the conduit 52 contact the round support arm 42 along tangents 70 to the support arm 42. When the downward force $F_1$ is applied on the clamp 46 by the patient, the clamp 46 is centered and the force $F_2$ acts on the support arm 42 along the tangents 70. The force $F_1$ on the clamp 46 causes the clamp 46 to center, causing the grip arms 54 to grip the support arm 42 at multiple contact points 74 creating static friction. When the static friction is higher than a moving friction, the clamp 46 is stationary and does not move along the support arm 42, In some embodiments, the clamp 46 can include at least two grip arms 54. In some embodiments, the clamp 46 can include at least three grip arms 54. In some embodiments, the clamp 46 can include more than two grip arms 54. In some embodiments, the support arm 44 can have a cross-section that may be hexagonal, circular, or of some other shape. Such a support arm 44 can be configured to pass through an octagonal conduit 52 in the clamp 46.

Although this disclosure refers to specific embodiments, it will be understood by those skilled in the art that various changes in form and detail may be made without departing from the subject matter set forth in the accompanying claims. For example, the disclosure has been illustrated and described in detail in the drawings and the foregoing description, such illustration and description are to be considered illustrative or exemplary and not restrictive. The disclosure is not limited to the disclosed embodiments. From reading the present disclosure, other modifications will be apparent to a person skilled in the art. Such modifications may involve other features, which are already known in the art and may be used instead of or in addition to features already described herein. In the claims, the word "comprising" does not exclude other elements or steps, and the indefinite article "a" or "an" does not exclude a plurality.

The invention claimed is:

1. A patient helper comprising:

a support arm configured to be secured to a patient support apparatus, a clamp movable along the support arm positioned parallel to the patient support apparatus to a plurality of positions, the clamp including a plurality of grip arms, the grip arms pivotably coupled at a first location with a first pin and at a second location with a second pin, the first and second pins defining a first axis that is perpendicular to the support arm, a tether supported by the first pin, and a handle supported by the tether, wherein the grip arms of the clamp are movable between a first position, in which when a first force is applied to the tether, the first pin is configured to transfer the first force to the grip arms such that the grip arms apply a second force to the support arm sufficient to prevent movement of the clamp along the support arm, and a second position in which the clamp is free to move along the support arm.

2. The patient helper of claim 1, wherein the first pin is supported in a slot in the plurality of grip arm.

3. The patient helper of claim 1, wherein the first pin is a support pin that when loaded acts upon the grip arms to transfer the first force applied to the tether by a patient.

4. The patient helper of claim 3, wherein the force is applied by the patient through the handle supported by the tether.

5. The patient helper of claim 4, wherein the support pin induces a moment along a second axis that moves the grip arms to the first position and locks the clamp on the support arm preventing movement of the clamp along the support arm position when the force is applied by the patient.

6. The patient helper of claim 4, wherein the clamp is unlocked, and the grip arms are configured to be in the second position when the force applied by the patient is removed.

7. The patient helper of claim 1, wherein the clamp comprises at least a first and a second grip arm, and wherein the first and the second grip arm form an octagonal conduit.

8. The patient helper of claim 1, wherein the clamp includes a first grip arm and a second grip arm, the first grip arm and the second grip arm are coupled with the first pin and the second pin to form a conduit configured to fit the support arm.

9. The patient helper of claim 8, wherein the conduit formed by the first grip arm and the second grip arm is an octagonal conduit.

10. A clamp for a patient support apparatus comprising a plurality of grip arms, the grip arms pivotably coupled at a first axis, the clamp further including a first pin, wherein the grip arms of the clamp are movable between a first position, in which when a first force is applied to a tether supported by the clamp the grip arms apply a second force to a support arm sufficient to prevent movement of the clamp along the support arm, and a second position in which the clamp is free to move along the support arm, wherein the grip arms are pivotably coupled at a first location with the first pin and at a second location with a second pin, the first and second pins defining a first axis.

11. The clamp of claim 10, wherein the first pin is configured to transfer a force applied to the tether supported by the first pin to the grip arms.

12. The clamp of claim 11, wherein the force is applied by the patient through a handle supported by the tether.

13. The clamp of claim 12, wherein the first pin induces a moment along a second axis that moves the grip arms to the first position and locks the clamp on a support arm on the patient support apparatus, thereby preventing movement of the clamp along the support arm when the force is applied by the patient.

14. The clamp of claim 12, wherein the clamp is unlocked, and the grip arms are configured to be in the second position when the force applied by the patient is removed.

15. The clamp of claim 10, wherein the clamp comprises at least a first and a second grip arm, and wherein the first and the second grip arm form an octagonal conduit.

16. A patient support apparatus comprising:

a patient helper comprising:

a clamp movable along a support arm positioned parallel to the patient support apparatus to a plurality of positions, the clamp including a first grip arm and a second grip arm, the first grip arm and the second grip arm coupled with a first pin and a second pin to form a conduit configured to fit the support arm, a tether supported by the first pin, and a handle supported by the tether, wherein the grip arms of the clamp are movable by the tether between a first position in which the grip arms apply a force to the support arm sufficient to prevent movement of the clamp along the support arm and a second position in which the clamp is free to move along the support arm.

17. The patient support apparatus of claim 16, wherein the pin is supported in a slot in the grip arm.

18. The patient support apparatus of claim 16, wherein the first and the second grip arm form an octagonal conduit.

19. The patient support apparatus of claim 16, wherein the first and second grip arms are pivotably coupled at a first location with the first pin and at a second location with the second pin along a first axis, wherein the first axis is perpendicular to the support arm.

20. The patient support apparatus of claim 16, wherein the first pin is a support pin that when loaded acts upon the grip arms to transfer the first force applied to the tether by a patient.

* * * * *